No. 801,908. PATENTED OCT. 17, 1905.
C. A. A. RAND.
REEL DRIVE MECHANISM FOR HARVESTERS.
APPLICATION FILED APR. 14, 1905.
2 SHEETS—SHEET 1.
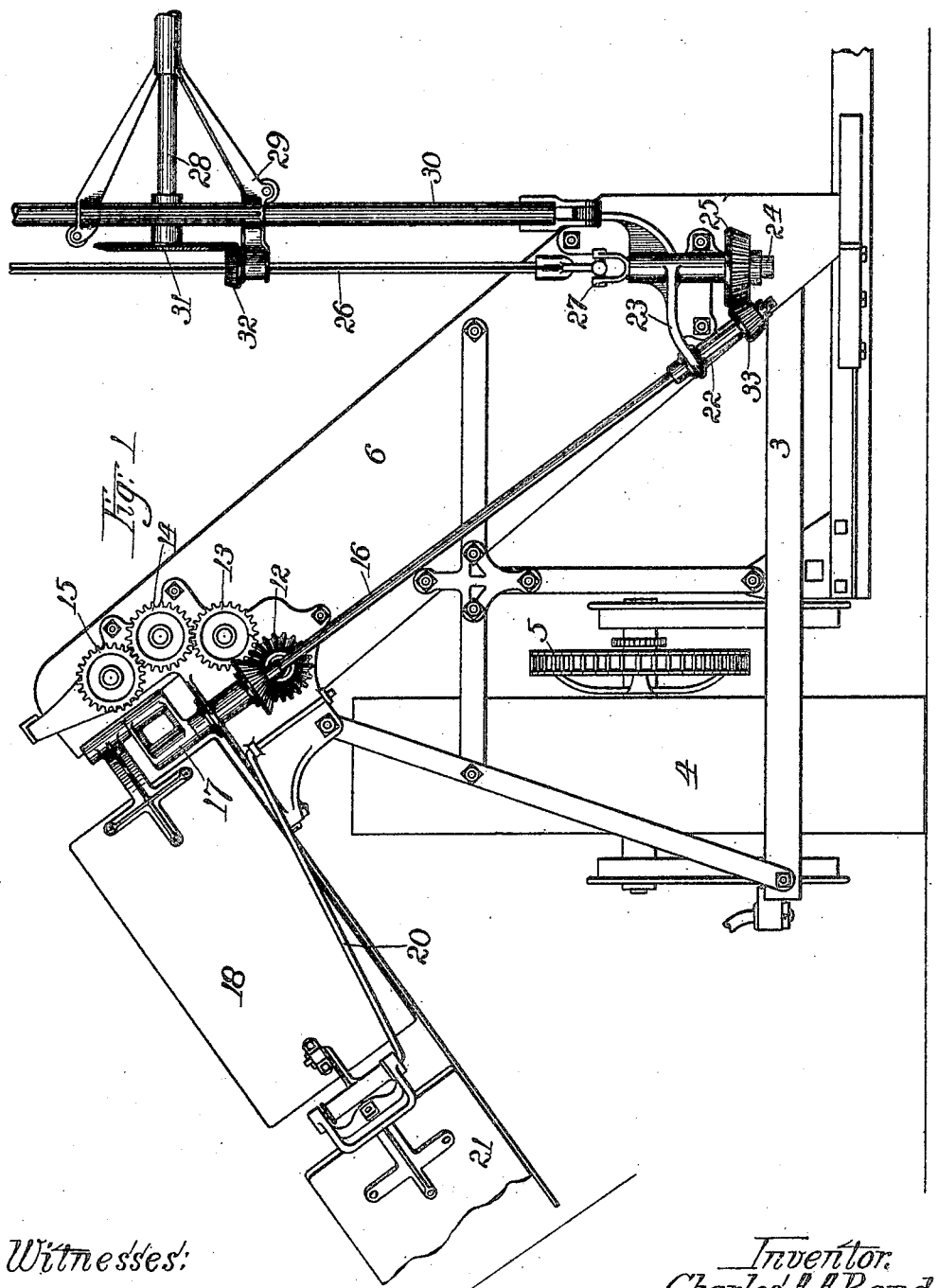

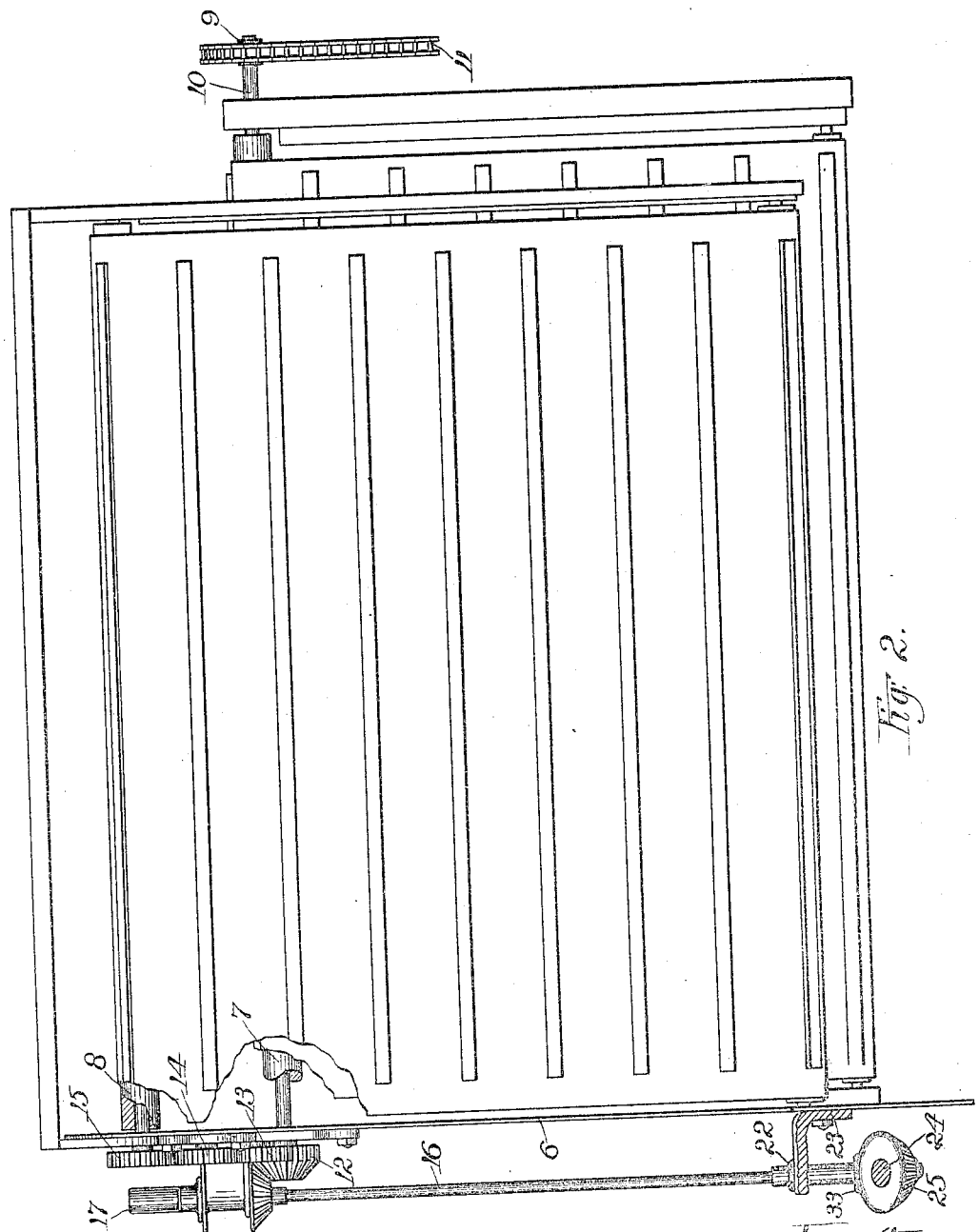

UNITED STATES PATENT OFFICE.

CHARLES A. ANDERSON RAND, OF CHICAGO, ILLINOIS, ASSIGNOR TO INTERNATIONAL HARVESTER COMPANY, A CORPORATION OF NEW JERSEY.

REEL-DRIVE MECHANISM FOR HARVESTERS.

No. 801,908.  Specification of Letters Patent.  Patented Oct. 17, 1905.

Application filed April 14, 1905. Serial No. 255,483.

*To all whom it may concern:*

Be it known that I, CHARLES A. ANDERSON RAND, a citizen of the United States, residing at Chicago, in the county of Cook and State of Illinois, have invented certain new and useful Improvements in Reel-Drive Mechanism for Harvesters, of which the following is a specification, reference being had to the accompanying drawings, forming a part thereof.

My invention relates to reel-drive mechanism for harvesters; and it consists in mounting a shaft upon the forward side of the elevator-frame and having it extend diagonally downward and adapted to directly drive the reciprocating butter at its upper end and give motion to a vertical counter-shaft at the lower end of the elevator-frame that is connected to the vertical reel-driving shaft by means of a universal coupling, the object of the invention being to reduce the number of parts heretofore employed and to provide a simple and cheap construction for giving motion to the mechanism indicated. I attain these objects by the mechanism illustrated in the accompanying drawings, in which—

Figure 1 is a front side view of as much of a harvester sufficient to show the application of my invention, and Fig. 2 is a grainward side elevation of a part of Fig. 1.

Similar numerals refer to similar parts throughout the several views.

The main frame of the harvester is represented by the numeral 3, the drive-wheel by 4.

5 is the main driving-sprocket rotating with the wheel and transmitting motion to the various parts in any of the well-known ways.

6 is the elevator-frame, in which are mounted the upper and lower elevator-carriers in the usual way, 7 being the upper roller of the lower carrier and 8 the upper roller of the upper carrier. The roller 7 derives motion by means of the sprocket-wheel 9, secured to the rear end of its shaft 10, and the chain 11 in a well-known way. Secured to the forward end of the roller-shaft 10, or roller-gudgeon, is a combined spur and bevel gear 12, the spur-gear transmitting motion to the upper roller of the upper elevator-carrier by means of the intermediate spur-gears 13 and 14 and the spur-gear 15 at the end of the gudgeon of roller 8 and the bevel-gear to a diagonally-arranged shaft 16, supported in bearings secured to the elevator-frame. At the upper end of the shaft 16 is secured a crank 17, and mounted upon the crank is the butter 18, supported at its lower end by the swinging arm 20, and 21 is the extension to the butter. The lower end of the shaft 16 is journaled in a bearing 22, supported by a bracket 23, secured to the elevator-frame. A short vertically-arranged counter-shaft 24 is journaled in the bracket 23 and has a bevel-wheel 25 secured to its lower end, and is connected at its opposite end with a vertically-arranged reel-driving shaft 26 by means of a universal coupling 27, that permits a fore-and-aft swing of the shaft at its upper end in a common manner. The reel-shaft 28 is journaled in a bracket 29, which is adapted to slide upon the swinging reel-supporting standard 30 in a well-known way for the purpose of adjusting the reel to a higher or lower level, the standard 30 being pivoted upon the bracket 23. A bevel-wheel 31 is secured to the reel-shaft, and a pinion 32, splined with the shaft 26, meshes therewith. At the lower end of the diagonally-arranged shaft 16 is secured a bevel-pinion 33, that meshes with the bevel-wheel 25 and communicates motion thereto. As constructed the reel is driven by a mechanism that is positive in its action and comprising few parts.

What I claim as my invention, and desire to secure by Letters Patent, is—

1. In a reel-driving mechanism for harvesters, the combination of a reel-shaft, a vertically-arranged shaft suitably supported in a manner to allow it to swing in a fore-and-aft direction at its upper end, motion-transmitting means connecting said vertically-arranged shaft with said reel-shaft, an elevator, a butt-adjuster located at the delivery end of said elevator, a shaft diagonally arranged between said butt-adjuster and the lower end of said vertically-arranged shaft, motion-transmitting means directly connecting said diagonally-arranged shaft with said butt-adjuster and said vertical shaft, and means for driving said diagonally-arranged shaft.

2. In a reel-driving mechanism for harvesters, the combination of a reel-shaft, a vertically-arranged counter-shaft, a vertically-arranged reel-driving shaft connected with said counter-shaft by means of a universal coupling, motion-transmitting means connecting said vertically-arranged reel-driving shaft and said reel-shaft, an elevator, a butt-adjuster located at the delivery end of said elevator, a shaft diagonally arranged between said butt-adjuster and said counter-shaft, motion-transmitting means directly connecting said diagonally-arranged shaft with said butt-adjuster and said counter-shaft, and means for driving said diagonally-arranged shaft.

3. In a reel-driving mechanism for harvesters, the combination of a reel-shaft, a vertically-arranged counter-shaft, a vertically-arranged reel-driving shaft connected with said counter-shaft by means of a universal coupling, motion-transmitting means connecting said vertically-arranged reel-driving shaft with said reel-shaft, an elevator-frame, upper and lower elevator-carriers comprising driving-rollers suitably mounted in said frame, a butt-adjuster suitably mounted at the delivery end of said elevator-carriers, a shaft suitably mounted upon said elevator-frame and deriving motion from the driving-roller of said lower carrier, said shaft communicating motion directly to said butt-adjuster and to said vertically-arranged counter-shaft.

4. In a reel-driving mechanism for harvesters, the combination of a reel-shaft, a reel-supporting standard, a reel-supporting bracket adapted to slide upon said standard and in which said reel-shaft is journaled, a main frame and drive-wheel, an elevator-frame, upper and lower elevator-carriers comprising driving-rollers suitably mounted in said elevator-frame and adapted to deliver the grain to a point above said drive-wheel, a gear-bracket secured at the lower end of said elevator-frame, a vertical shaft journaled in said gear-bracket, and the reel-supporting standard pivoted thereto, a reel-driving shaft journaled in said reel-supporting bracket and connected to said vertical shaft by means of a universal coupling, a butt-adjuster mounted at the delivery end of the elevator-carriers, and a diagonally-arranged shaft having its upper end provided with a crank adapted to give motion to said butt-adjuster, and its lower end journaled in said gear-bracket and provided with a pinion, a bevel-wheel upon the lower end of said vertical shaft meshing with said pinion, and means for communicating motion to said driving-shaft.

In witness whereof I hereto affix my signature in presence of two witnesses.

CHARLES A. ANDERSON RAND.

Witnesses:
  T. N. DAGGETT,
  INGOLF C. KLEPPE.